March 19, 1963     H. W. GRISWOLD ET AL     3,081,515
FORAMINOUS NONWOVEN FABRIC Filed April 26, 1955     10 Sheets-Sheet 1

INVENTORS
HECTOR W. GRISWOLD
GEORGE W. PEARCE
BY Charles A. Harris
ATTORNEY

INVENTORS
HECTOR W. GRISWOLD
GEORGE W. PEARCE
BY
Charles C. Harris
ATTORNEY

INVENTORS
HECTOR W. GRISWOLD
GEORGE W. PEARCE
BY
ATTORNEY

March 19, 1963  H. W. GRISWOLD ET AL  3,081,515
FORAMINOUS NONWOVEN FABRIC

Filed April 26, 1955  10 Sheets-Sheet 6

INVENTORS:
HECTOR W. GRISWOLD
BY GEORGE W. PEARCE

Charles A. Harris
ATTORNEY

March 19, 1963 H. W. GRISWOLD ET AL 3,081,515
FORAMINOUS NONWOVEN FABRIC
Filed April 26, 1955 10 Sheets-Sheet 7
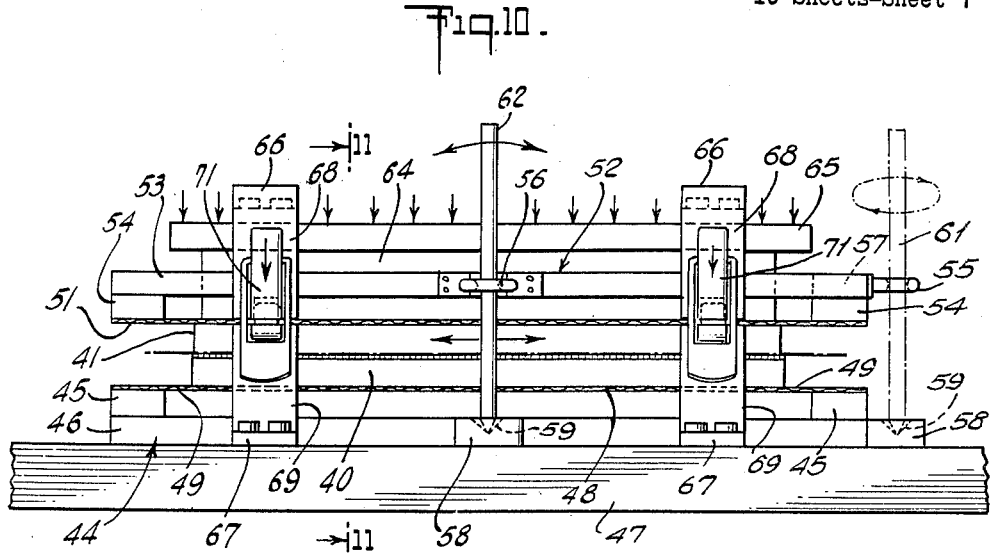
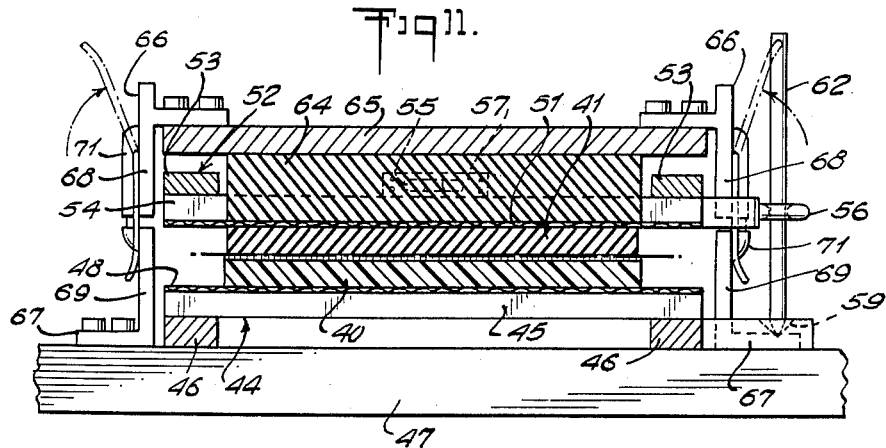
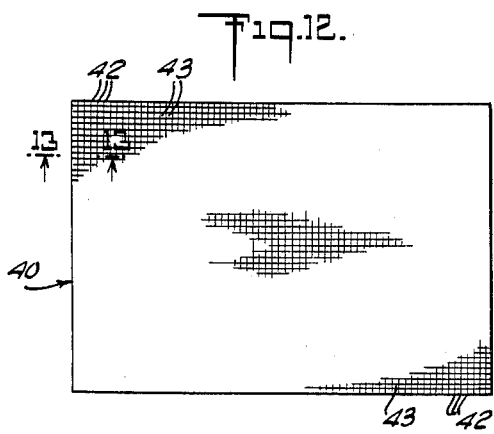
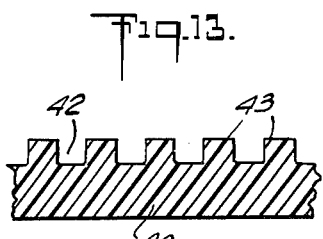
INVENTORS:
HECTOR W. GRISWOLD
BY GEORGE W. PEARCE
Charles A. Harris
ATTORNEY

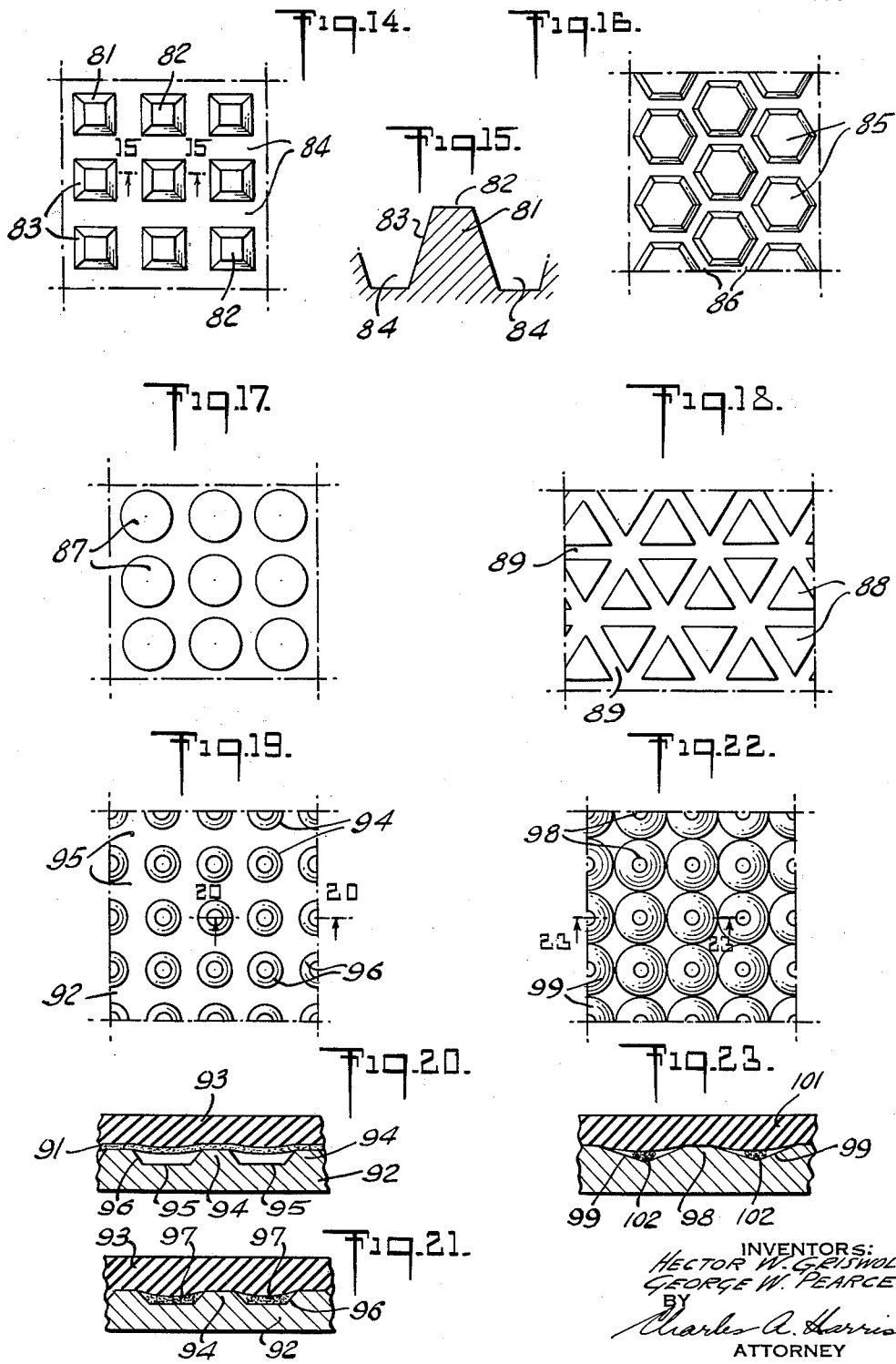

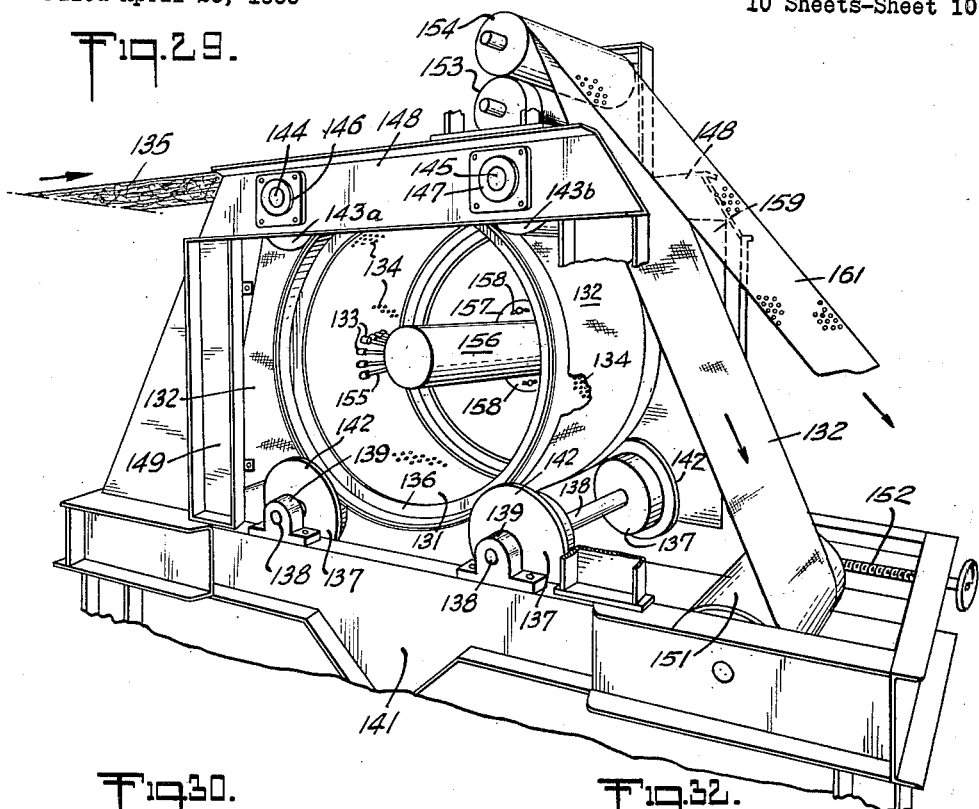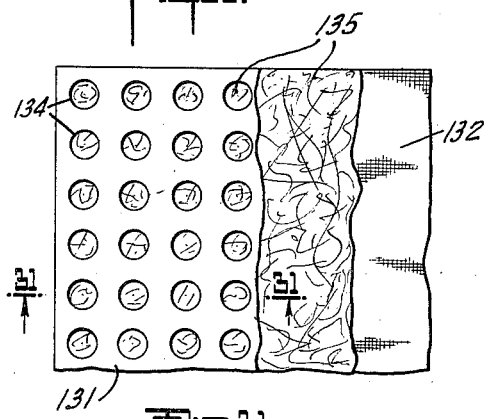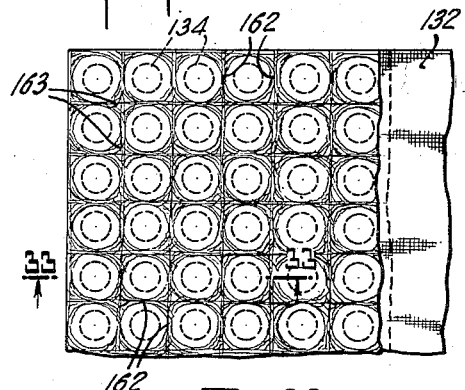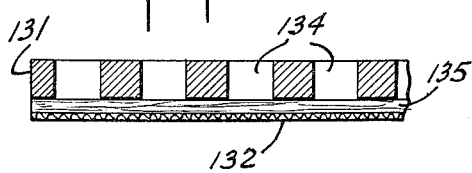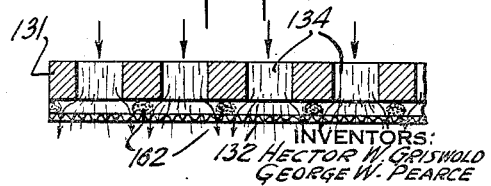

United States Patent Office 3,081,515
Patented Mar. 19, 1963

3,081,515
FORAMINOUS NONWOVEN FABRIC
Hector W. Griswold, Longmeadow, and George W. Pearce, Danvers, Mass., assignors, by mesne assignments, to Johnson & Johnson, New Brunswick, N.J., a corporation of New Jersey
Filed Apr. 26, 1955, Ser. No. 503,872
12 Claims. (Cl. 28—78)

This invention relates to textile fabrics, and is more particularly concerned with so-called "nonwoven" fabrics, i.e., fabrics produced directly from fibers without the use of conventional spinning, weaving, or knitting operation.

The present application is a continuation-in-part of our co-pending applications, Serial Nos. 437,037 and 437,038, both filed June 16, 1954. Serial No. 437,037 is now abandoned.

Heretofore, nonwoven fabrics have been essentially different in structure from fabrics which have been woven or knitted. In a woven or knitted fabric, the fibers of the material making up the fabric do not occur individually, but are twisted into yarns or threads which in turn are woven or knitted into the fabric. In the well-known spinning operation, fibers are spun or twisted together tightly into mechanical and frictional engagement with one another to form yarns which are substantially circular in cross section. It is these yarns, not the fibers acting individually, which serve as the structural members of the resulting woven or knitted fabrics. Generally speaking, these fabrics comprise reticular structures of intersecting, intertwining yarns which define interstices between them.

Nonwoven fabrics have been of two main types, felts and bonded webs. In each of these, the fibers making up the fabric occur individually and act individually as structural members. This is true even through the fibers in many felts are so highly interlocked and compressed together that it is difficult to identify individual fibers. Hat felts, for instance, are extremely dense, relatively "hard" fabrics without apparent interstices, which are quite dissimilar in appearance and qualities to woven or knitted structures. On the other hand, the fibers in bonded webs are usually flatly assembled in layers, more or less oriented in one direction, as in a card web; or arranged in a "random" manner, as in an air laid isotropic web. Various bonding agents have been used to print a binder pattern on such webs or to impregnate them to hold the individual fibers together. In this type of fabric, the fibers may remain relatively straight and overlapping one another with very little interlocking between them. They are usually arranged in a more or less uniformly spaced condition in the plane of the web, in such a way that only very small randomly occurring interstices are apparent between the overlapped fibers and those fibers between interstices remain spaced and more or less flatly arranged, possessing little similarity to the yarns of woven or knitted fabrics.

The present invention contemplates a nonwoven fabric wherein the fibers are arranged to define a predetermined pattern of holes or openings with most of the fiber segments bordering the holes extending in substantial parallelism with portions of their perimeters. In general, the fibers are oriented in interconnected groupings or web areas extending between the holes in a predetermined pattern corresponding to the aforementioned pattern of holes. The resulting fabric may be made to resemble a particular woven or knitted fabric. The groupings or groups are connected by fibers extending from one to another in such a way that they are common to a plurality of groupings. It is preferred that the average length of the fibers be considerably greater than the lengths of the groups containing them with the result that the groups predominately comprise only parts or segments passing through them. Preferably the fibers average at least about ¼ inch in length and are textile-like in nature, i.e., flexible and distinct or unbeaten in the case of wood pulp. In general, the groupings are connected at junctures wherein individual fibers extend in a plurality of diverse directions, while the fiber segments in the groups are relatively parallelized with respect to one another and more closely assembled than at the junctures. In one embodiment of a fabric according to this invention, the fiber segments in the groups are closely associated and substantially parallelized along the axes of the groups to the extent that the groups resemble spun yarns. The segments may be so closely arranged in overlapping relationship about the axes of the groups that the groups possess yarn-like thickness and are generally yarn-like in cross section.

In the foraminous structure formed by the interconnected fiber groupings the fibers lie in a state of mechanical equilibrium. The fibers are mechanically engaged, both frictionally and/or by interlocking of the fibers, to the extent that the arrangements of fibers is one of equilibrium. Generally speaking, the frictional engagement and interlocking between the fibers in the groupings, while contributing strength to the fabric, may be insufficient in itself to provide adequate tensile strength for many applications. Therefore, it may be desirable to strengthen the fabric in some way. For instance, an adhesive bonding material or binder may be applied by means such as printing or impregnation. As will be described more fully hereinafter, a binder may be contained in the web or layer of fibers from which the fabric is formed during and after its formation into the fabric of this invention. However, even this binder may not be present in sufficient quantity and additional binder may be required to provide adequate strength.

Due to their structure and appearance and other qualities described in the foregoing paragraph, fabrics of this invention are particularly adapted for use in surgical dressings, absorbent dressings such as sanitary napkins and diapers, most suitably for covering sanitary napkins and diapers, in wiping cloths, toweling, filter materials, lining materials, industrial base fabrics, as a substitute for gauze and gauze-like fabrics in general, and a variety of other applications.

The present invention contemplates methods for producing the fabric of this invention from a base web or layer of fibers such as may be produced by carding, garnetting, air deposition, paper making techniques, etc. These methods involve the application of external forces to such a web to move its fibers into groupings arranged in a predetermined pattern. Means comprising spaced projections defining interconnected grooves or spaces between them arranged in a predetermined pattern, may be employed for this purpose. External forces may be applied to the web to move the fibers it contains into the grooves or spaces between the projections.

The web may be placed between molding means defining spaced projections and a cooperating resilient surface which may be oscillated slightly with respect to one another in the direction of the lay of the web to move the fibers away from the ends of the projections and into the spaces between them. The resilient surface may be presented by one side of a sponge rubber belt which first may constrain the web in contact with the ends of the projections and then move them relative to the projections into the aforesaid spaces. The shape, size and arrangement of the projections and correspondingly the shape, size and arrangement of the openings in the resulting fabric and the arrangement of the fiber groupings between them may be varied to provide fabrics of different patterns resembling various woven and knitted and other fabrics such as gauze, buckram, marquisette, lace, etc.

Advantages of the invention other than those generally described above will be apparent from the following description and claims taken together with the drawings wherein:

FIG. 10 is a view in elevation of a device for forming a fabric according to this invention;

FIG. 11 is a view partly in section and partly in elevation along the line 11—11 of FIG. 10;

FIG. 12 is a plan view of the surface of the forming means of the device of FIG. 10;

FIG. 13 is an enlarged sectional view along the line 13—13 of FIG. 12;

FIG. 14 is an enlarged plan view of molding means comprising tapered projections;

FIG. 15 is a sectional view along the line 15—15 of FIGURE 14;

FIG. 16 is a view similar to FIG. 14 of molding means comprising hexagonal projections with inclined sides;

FIG. 17 is a similar view showing molding means comprising round projections arranged in a square pattern;

FIG. 18 is a plan view of means comprising triangular projections;

FIG. 19 is a plan view of means presenting spaced frusto-conical projections;

FIG. 20 is an enlarged schematic sectional view along the line 20—20 of FIG. 19 showing a layer of starting material positioned between the ends of the projections and cooperating means also in section;

FIG. 21 is a view similar to FIG. 20 at a later stage in the process;

FIG. 22 is a plan view similar to FIGURE 19 showing a somewhat different form of projections;

FIG. 23 is a sectional view similar to FIGURE 20 along the line 23—23 of FIGURE 22;

FIG. 29 is a partially cut away perspective view of another apparatus for forming a fabric according to this invention;

FIG. 30 is a fragmentary partially cut away schematic plan view of a developed segment of the drawing of FIG. 29, showing a fibrous layer of starting material positioned between the drum and the foraminous backing screen of this figure;

FIG. 31 is an enlarged schematic sectional view taken along the line 31—31 of FIG. 30;

FIG. 32 is a view similar to FIG. 30 with the drum portion indicated in phantom, showing the layer after it has been formed into a fabric according to this invention; and FIG. 33 is an enlarged schematic sectional view taken along the line 33—33 of FIG. 32.

Figure 1:
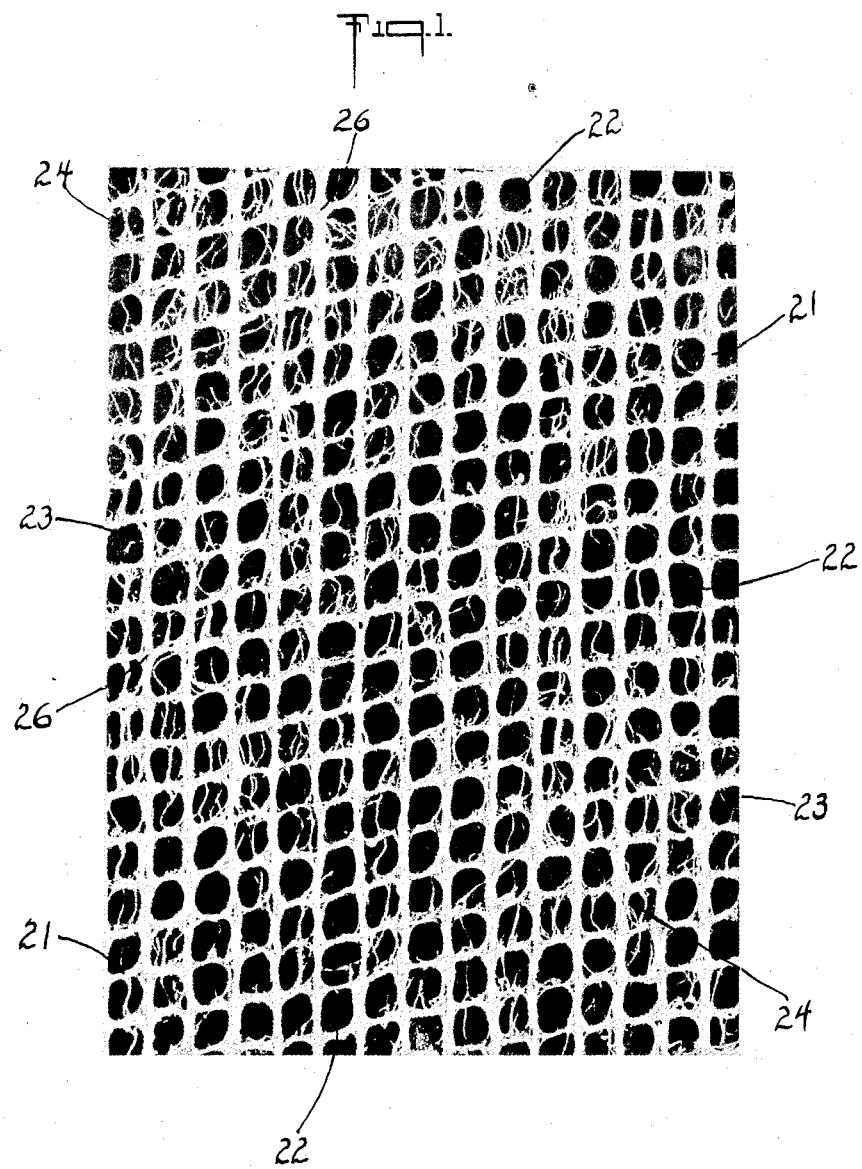
FIG. 1 is a photomicrograph of a typical nonwoven fabric according to one embodiment of this invention at an original enlargement of approximately 6 to 1.
Figure 2:
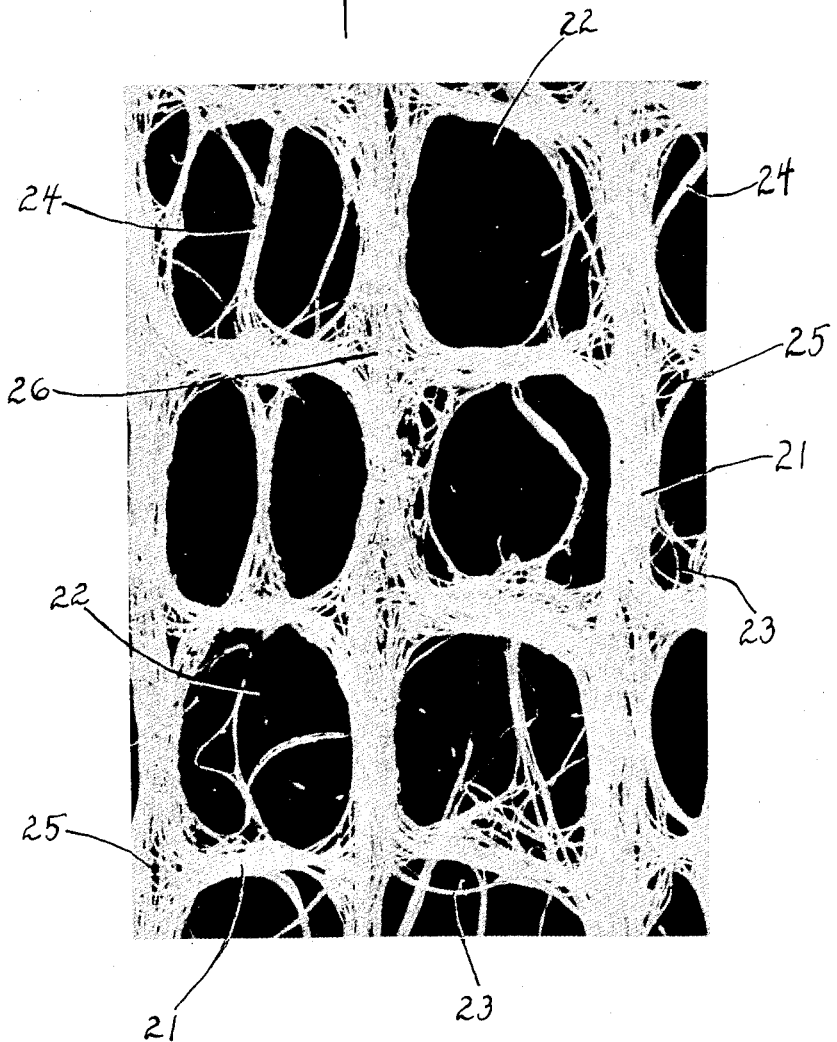
FIG. 2 is a photomicrograph of a portion of the fabric of FIG. 1 at an original enlargement of about 30 to 1.
Figure 3:
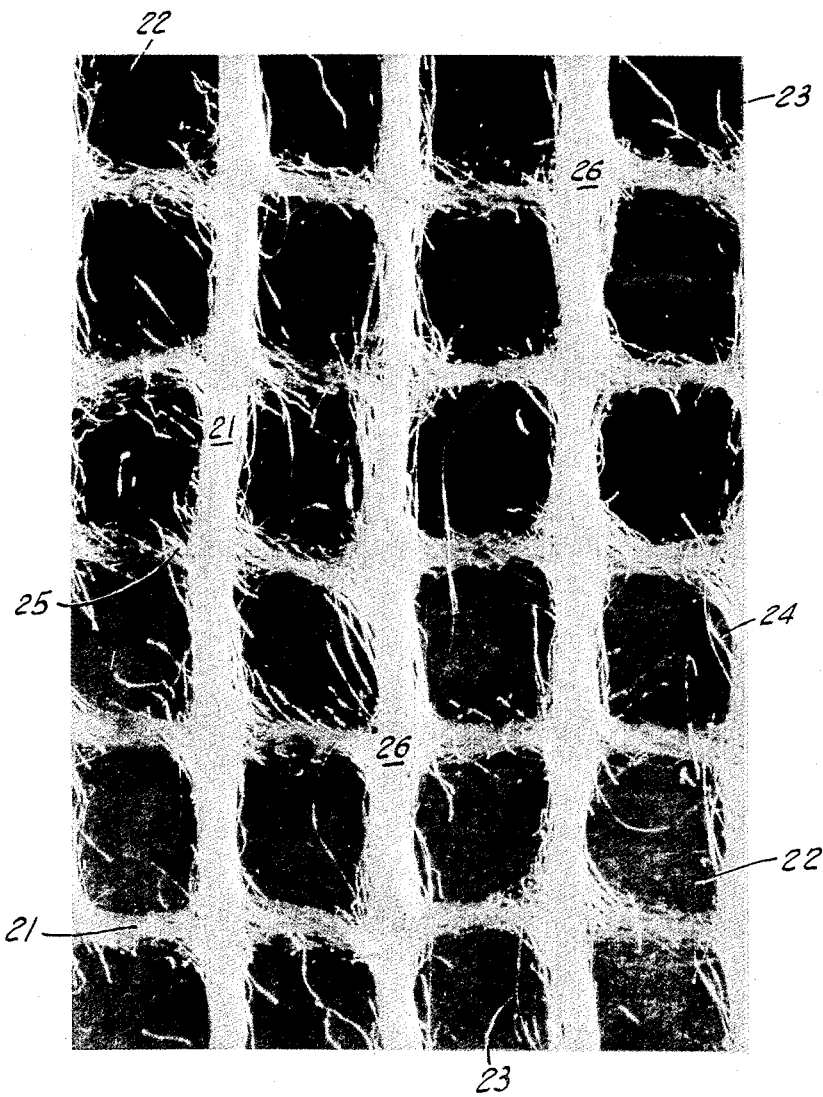
FIG. 3 is a photomicrograph of a similar fabric according to this invention at an original enlargement of about 24 to 1.

Referring to FIGS. 1, 2 and 3 of the drawings, there are shown typical portions of nonwoven fabrics according to one embodiment of this invention comprising interconnected yarn-like groupings, groups or bundles 21 of closely associated and substantially parallelized fiber segments. The groups or bundles are arranged in a definite pattern forming a gauze-like reticular structure wherein interconnected groups extend at substantially 90 and 180 degrees to one another. The fibers are quite closely associated in the groups with the result that the groups appear tight and adjacent groups define relatively distinct and "square" holes or openings 22 between them. The groups extending in the vertical direction in FIGS. 2 and 3 appear heavier and more tightly formed, probably because the fibers in the base webs from which these fabrics were formed were oriented predominately in this direction. There appear to be a number of fiber segments 23 which lie outside the groupings and extend between them and some of these segments 23 may combine to form irregularly-located small groups 24 extending between the main groups 21. As shown more particularly in FIGS. 2 and 3, the groups 21 come together at junctures 26 where they are interconnected by fibers 25 which are common to more than one of the groups. The fibers passing through the junctures 26 are oriented in a plurality of diverse directions forming "diamond" shaped fiber areas which appear similar to highway intersections. As is seen from FIGS. 1–3 and 6–9, the yarn-like fiber groups in areas of fabric containing the same are located between spaced generally parallel planes generally defining the opposed surfaces of the fabric in said areas. Generally in these areas the yarn-like fiber groups predominantly constitute the body of the fabric.

Since it is difficult to distinguish the shape and arrangement of the individual fibers in FIGS. 1, 2 and 3, a more detailed description of this type of fabric will be reserved for the somewhat stylized version of FIGS. 6 and 7, described hereinafter.

Figure 4:
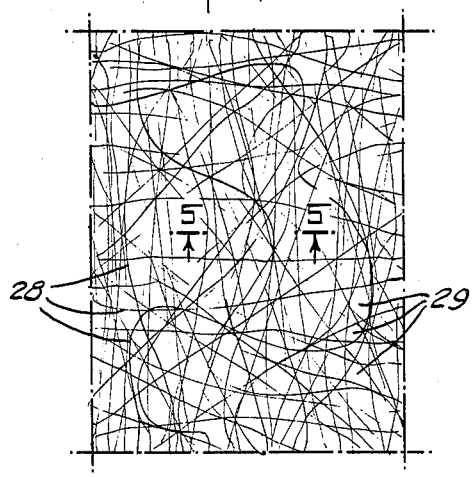
FIG. 4 is a schematic plan view of a typical base web from which the fabric of this invention may be formed.
Figure 5:
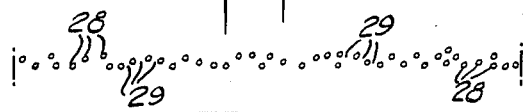
FIG. 5 is an enlarged cross sectional view taken along the line 5—5 of FIG. 4.

Referring to FIGS. 4 and 5, a nonwoven fabric according to one embodiment of this invention may be formed from a base web of flexible fibers 28 arranged in substantially nonoriented, overlapping, intersecting relation with one another, such that there is only slight entanglement between them. The fibers in the web are flatly assembled in nongrouped relationship with one another, such that they define only relatively small interstices 29 between them. The web may contain a small percentage of a uniformly dispersed moisture softenable adhesive binder to assist in maintaining the web integrity as it is subjected to forces designed to cause its fibers to form into a fabric according to this invention.

Figure 6:
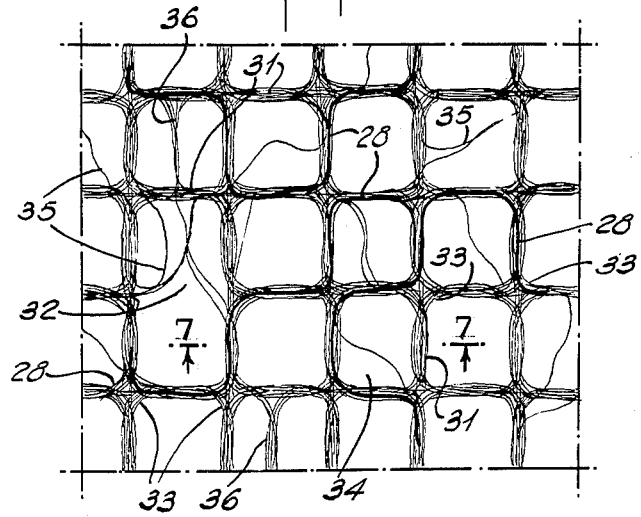
FIG. 6 is a schematic plan view of the web of FIG. 4 after it has been rearranged to form a fabric typical of one embodiment of this invention.
Figure 7:
FIG. 7 is an enlarged sectional view taken along the line 7—7 of FIG. 6.

In FIGS. 6 and 7, there is shown a fabric of this invention formed from the above-described base web, wherein the fibers 28 are bent and arranged in a gauze-like reticular structure of interconnected groupings or bundles 31 of fiber segments. The groups or bundles 31 extend at approximately 90 and 180 degrees to one another and, except where there is an irregularity in the fabric, as at 32 in FIG. 6, four groups come together at each juncture 33 wherein the fibers are oriented in a plurality of diverse directions. Some fibers from each of these four groups pass into each of the groups with the result that the groups are connected by fibers common to a plurality of groups. The individual fibers may be considerably longer than the groups containing them with the result that each fiber may extend through a plurality of interconnected groups and each of the groups may contain only a portion or a segment of each of the fibers passing through it. The fiber segments may be closely associated and substantially parallelized about the longitudinal axes of the groups to the extent that the segments in the groups appear to be in substantial contact with one another along their length when viewed by the naked eye or under a microscope at low magnifications. The individual fibers may pass from one group and enter a given juncture into any one of the other three groups entering the same juncture. Thus, they may either extend substantially straight or take 90 degree turns into the groups interconnected at these angles. Although the bends in the fibers may be due to their presence in groups interconnected at right angles to one another, the fibers curve as they bend to pass from one group to another. The tighter the groups are formed, the sharper will be the bends in the fibers and the shorter will be their radii of curvature. The fibers may extend through a more or less symmetrical set of groups in such a way that they will be sinuous in shape. However, the fibers may wander through the groups turning back on themselves and adopting irregular configurations. The paths of typical individual fibers 28 are shown in heavy lines in FIG. 6.

The resulting groups or bundles 31 of fiber segments may possess yarn-like thickness. The fiber segments may be substantially parallelized and closely arranged about the longitudinal axes of the groups to the extent that the groups are yarn-like in cross section. As shown in FIG. 7, the groups 31 possess yarn-like thicknesses in two dimensions, both in the plane of the web and perpendicular thereto, and tend to be oval in cross section. The fibers in a given cross section of the fabric of this invention may appear closely assembled in the groups 31, in such a way that there appears to be a good deal of contact between them. The spaced groups define enlarged holes 34 between themselves similar to the interstices between the yarns of a conventional woven gauze. Most of the fiber segments bordering the holes extend in substantial parallelism with corresponding portions of their perimeters. That is to say, they extend around the holes and do not present ends adjacent their perimeters. In general, the tighter the groups or bundles are formed, the more clearly defined will be the voids between them. The size of the holes 34 will depend to a large extent upon the means employed to form the fabric of this invention, as will be described hereinafter. As mentioned hereinbefore in connection with FIGS. 1, 2 and 3, there may be a certain percentage of fiber segments which will fail to enter the main groups and will extend between them as random segments 35 or relatively small random bundles 36. However, in general the openings 22, 34 may be described as being substantially free of fibers.

Figure 8:
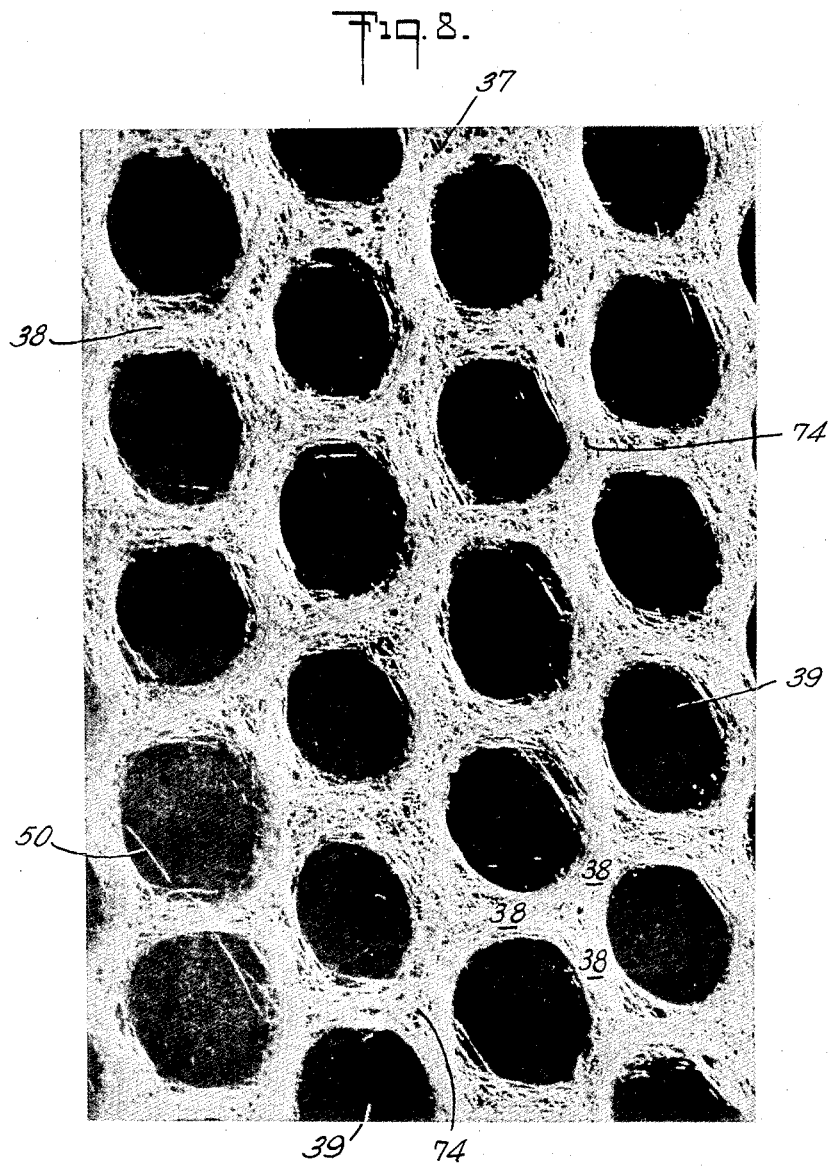
FIG. 8 is a photomicrograph of a somewhat different fabric according to this invention at an original enlargement of about 14 to 1.
Figure 9:
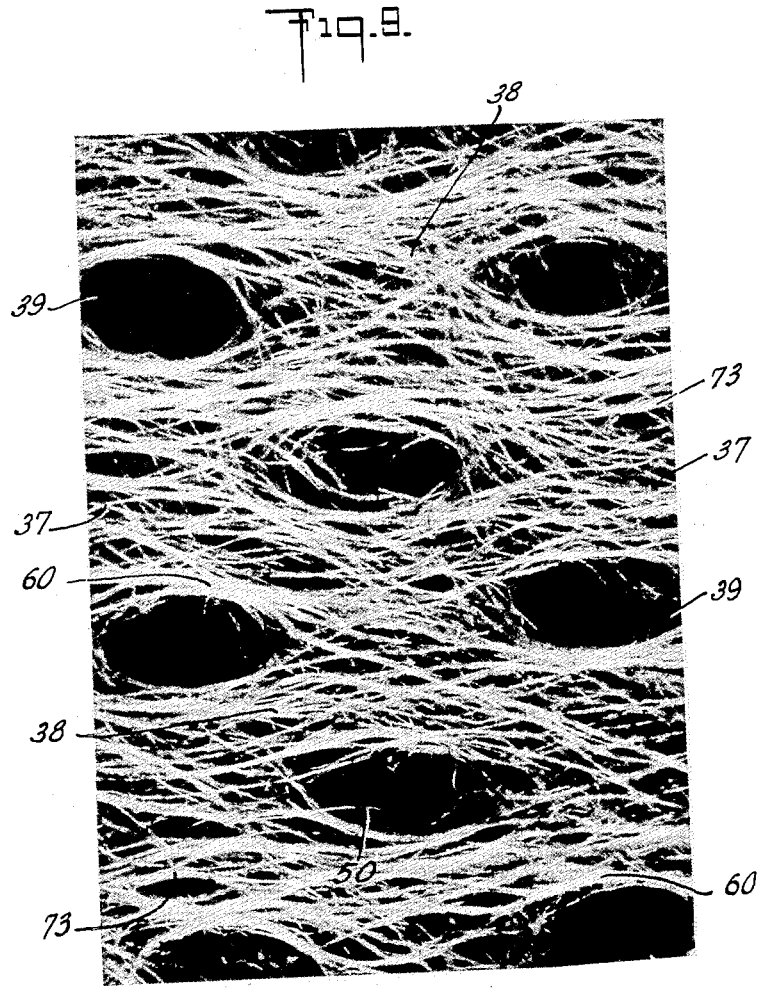
FIG. 9 is a photomicrograph of still another fabric at an original enlargement of approximately 30 to 1.

Referring to FIGS. 8 and 9 of the drawings, there are shown porous nonwoven fabrics comprising fibers 37 arranged in interconnected fiber groupings or web areas 38 defining holes or openings 39 arranged in predetermined patterns in the fabric. The holes 39 are distinct and substantially free of fibers passing through them. However, a certain number of random fiber segments 50 may remain extending through the openings without detracting materially from the porosity of the fabric or the clarity of hole formation. Most of the fibers or fiber segments bordering the holes extend in substantial parallelism with portions of the perimeters of the holes. That is to say, they extend around the holes and do not present ends adjacent their perimeters. As shown more particularly in FIG. 9, the holes may be bordered by smaller groups or bundles 60 of fiber segments wherein the fibers are more closely assembled than in the remaining areas of the fabric between holes. However, the fiber arrangement across the areas 38 between holes may be substantially uniform in density as appears to be the case in many areas of FIG. 8. The fiber groupings or areas 38 between holes may contain a multiplicity of much smaller interconnected groups or bundles 73 of fiber segments, as shown to an extent in FIG. 9. In FIG. 9, it appears that a large percentage of the fibers in the areas between holes 39 have lost their identity as individual fibers and merged with other fibers forming a network of interconected groups, strands or bundles 73 of highly parallelized fiber segments. As illustrated, particularly in FIG. 8, the main fiber groupings 38 may be interconnected at junctures 74 wherein the fibers extend in a plurality of diverse directions. The fibers in the groupings 38 extending between the junctures 74 in FIG. 8 are more parallelized and appear more closely assembled than at the junctures. However, they are not as closely assembled and parallelized as the fiber segments in the groupings 21 of FIGS. 1, 2 and 3. Most of the fibers in FIGS. 8 and 9 are considerably longer than the greatest dimension of the holes which they define with the result that they may extend around or pass several holes extending in different directions from grouping to grouping. Thus, the fibers may be shaped or bent to conform to the reticular structure in which they lie.

In the fabric of this invention, the fibers are in mechanical engagement with one another to the extent that the fabric structure is in mechanical equilibrium. The fibers are in frictional engagement with one another and their bent or curled configurations are entangled or interlocked and resist separation. In general, the frictional engagement and interlocking between the fibers is greater when they lie in interconnected yarn-like groups of fiber segments. In other words, both frictional engagement and interlocking are a function of the tightness or looseness of the fiber groupings. The closeness of the segments tends to constrain the fibers in the groups and the bends in the fibers tend to prevent their movement along the axes of the groups. Obviously, the longer the fibers, the more segments there will be in frictional engagement and the more bends or curls will be entangled. Thus, fabric strength is a function of fiber length as well as other variables. If a binder is present in the base web, a certain amount of it may become effective to a certain extent to hold the fibers in their new positions in the groupings. The effective binder may assist in holding the fibers in close contact with one another and may concentrate within the groups themselves, to assist in holding them together.

As mentioned hereinbefore, the starting material for the nonwoven fabric of this invention may be a layer of fibers 28 arranged in intersecting relation with one another, such that there is only slight entanglement between them, as shown in FIGS. 4 and 5. Webs of this type may be formed by carding, by air deposition, by liquid deposition such as in a paper making process, etc. They may be formed in a single layer or by laminating a plurality of webs formed by these techniques. The fibers in the base web may be arranged in a random manner or more or less oriented, as in a card web, or a card web laminate. The individual fibers may be relatively straight or slightly bent, occurring independently in the web in nongrouped intersecting relation with one another. They may intersect at various angles to one another such that, generally speaking, adjacent fibers only come into contact at the points where they cross. The overlapping, intersecting fibers form interstices 29 between them which vary in size with the fiber density of the web such that for preferred web weights of from 100 to 600 grains per square yard, only very small interstices are apparent. Webs ranging in weight from below 100 grains per square yard to the neighborhood of 2,000 grains per square yard may be formed into the fabric of this invention. Such webs may be held together by virtue of the mechanical engagement, i.e., the frictional contact and the aforementioned slight entanglement, between its fibers, as well as by any binder which may be present. Generally speaking, the fibers lie in mechanical equilibrium in the web or layer.

A web or layer of fibers, such as described above, may be subjected to external forces applied in a predetermined pattern. The patterned application of forces will cause portions of the fibers in the layer to move from corresponding areas thereof into positions surrounding these areas. The newly positioned fibers are in a new state of balanced equilibrium and will define holes or openings in the fabric arranged in accordance with the aforementioned pattern.

During the application of external forces, sufficient local support must be provided for preventing these forces from destroying the web integrity, i.e., from pulling the layer apart or from converting it into mere groups of fibers, etc. The supporting means employed must allow the fibers to move during the application of these forces to the extent that they may assume positions in mechanical equilibrium in the fabric. The fibers may be said to be in mechanical equilibrium in the fabric when the frictional engagement and interlocking between them hold them together.

An adhesive binder may be included in the web before its formation into a fabric according to this invention to provide local support and to facilitate web handling. However, such a binder may not be necessary, particularly when the web is fully supported by external means. A binder may be included in the web during its formation, in the case of a wet-formed web, for instance, or it may be added by impregnation, spraying, or other such means. In order that the fibers in the web may enter into the fabric structure, they must be free to move to a certain extent locally with respect to one another, as described hereinbefore. This means that the binder should be rendered sufficiently soft or plastic during the application of these forces, to allow this movement. A solvent or softening agent such as water may be added to the web for this purpose when the web contains a binder which may be softened in this way.

It is preferred that some liquid, such as water, be uniformly distributed in the web to assist in parallelizing fiber segments and bringing them into close association in the groups. The web may be wet to contain a maximum of water, for instance, prior to the application of bundling forces, although, in general, less water, in the neighborhood of 50 to 250 percent moisture, is preferred. The term "percent moisture" above, and when used in the following specification and claims, refers to percentage of moisture by weight of the dry web. Most fibers will absorb moisture, swell, and soften to a certain extent while retaining this moisture, such that if moistened fibers are brought together, they will tend to conform and fit closely with one another. As the fibers swell and soften under the influence of moisture, they may become nonresiliently bendable to the extent that they may be bent or curled to conform to the grooves and will retain their new configurations in contact with the other fibers. It is believed that the surface tension effect of the moisture in the grooves tends to move the fiber segments in the grooves closer together and into parallelism in the groups. Once the fibers are brought into alignment, the surface tension of the moisture tends to hold them there. The intensity of this effect will depend upon the amount of liquid present in the web. While good results may be obtained in accordance with the methods of this invention when the web contains 50 percent moisture, for instance, the above-mentioned surface tension effect should be greater with higher moisture contents.

In FIGS. 10 through 13, there is shown an illustrative device for forming a fabric according to this invention. A fibrous web, not shown, of the type decribed above, may be placed between a grooved molding member 40 and a resilient block 41 which are adapted to be oscillated with respect to one another along their plane of contact to cause the fibers in the web to move into the grooves of the molding member and form a porous fabric according to this invention. The surface of the molding member 40 presents a pattern of closely spaced intersecting grooves 42. As shown in FIGS. 12 and 13, the grooves intersect at right angles to one another and are spaced equally in the longitudinal and transverse directions of the molding member such that they define square raised portions or projections 43 between them. The grooves 42 may be substantially square in section and spaced from one another by an amount approximately equal to their width with the result that a sectional view through the molding member has a square toothed appearance. The molding member 40 may be of any suitable material which is sufficiently strong and will resist the wear and corrosion incident to its use. Polymethyl methacrylate, hard rubber, corrosion resistant metals and other similar materials will give good results. The resilient block 41 may comprise any suitable resilient material such as sponge rubber, for example.

As shown in FIGS. 10 and 11, the molding member 40 is supported by an open frame 44 comprising a pair of transverse bars 45 connecting the ends of a pair of spaced longitudinal bars 46. The longitudinal bars are fixed to a suitable support, such as a table 47, and the mold 40 is resiliently secured to the transverse bars 45 which are separated by a distance slightly greater than the length of the mold 40. The molding member is attached to a layer of resilient material 48, such as woven metal screening, which in turn may be extended and secured at its ends to the transverse bars 45. Those portions 49 of the resilient layer 48 between the ends of the molding member 40 and the transverse bars 45 are free to flex slightly to provide resilient support for the mold. The resilient block is similarly supported in an inverted fashion by a similar open frame. The resilient block 41 is attached to a resilient screen 51 which is secured to a frame 52 comprising longitudinal bars 53 and transverse bars 54 joined to form a structure corresponding to that of the aforementioned frame 44 supporting the molding block 40.

In order to oscillate the resilient block 41 and the molding member 40 with respect to one another to cause the fibers to move into the grooves of the mold, eyes 55 and 56 are provided on one end and one side, respectively, of the upper frame 52, extending outwardly therefrom. One of the eyes 56 is secured directly to the side of the frame and the other is secured to the frame through a block 57 which is attached to the upper surface of one of the end bars 54, thereby placing the two eyes on the same level. Fittings 58 containing recesses 59 vertically aligned with the normal position of the eyes are fixed to the table 47 outside of the lower frame 44. Levers 61 and 62, such as steel bars, for moving the upper frame with respect to the lower frame may be inserted through the eyes with their lower ends seated in the aforementioned recesses 59. Oscillatory motion is imparted in the longitudinal direction by grasping the upper end of the end lever 61 and moving it back and forth steadily in a longitudinal direction, and transverse oscillation may be achieved by operating the side lever 62 transversely in the same manner.

Clamping means are provided in order to hold the resilient block 41 firmly upon the grooved surface of the molding member 40. These means comprise a resilient pressure distributing block 64 which may be of the same material as the first resilient block, a clamping plate 65 for pressing downwardly upon the upper surface of the pressure distributing block, and releasable clamping means attached to the clamping plate 65 and the table 47 for holding or clamping the plate in position with respect to the table. The pressure distributing block 64 rests within the upper frame 52 upon the wire screen 51 supporting the resilient block, while the clamping plate 65 presses down upon the upper surface of the block with the clamping means extending from the plate to the table on either side of the upper and lower frame. The clamping means comprises pairs of spaced T-shaped members 66 attached to opposite sides of the clamping plate and corresponding pairs of spaced angle feet 67 secured to the table 47 on opposite sides of the lower frame 44. Corresponding legs 68 and 69 of the T-shaped members 66 and the clamping feet 67 extend downwardly and upwardly, respectively, towards each other on either side of the molding unit. Co-acting parts of luggage-type clamps 71 are attached to these legs to clamp the plate 65 to the table 47. The clamps 71 are located adjacent opposite ends of the molding member 40 in order to assure that pressure exerted upon the resilient block 41 through the above described clamping means will be distributed fairly uniformly over the mating surfaces of the molding member and the resilient block 41.

The resilient block 41 may be oscillated alternately lengthwise and crosswise by alternate operation of the end and side levers 61 and 62, or it may be oscillated in only one direction by the use of the appropriate lever. Alternate operation is advantageous since it aids effective grouping and the formation of more uniform groups. The benefits of alternate operation may be attained to some extent by swinging the end lever 61, for instance, back and forth in a circular path to oscillate the block 41 alternately lengthwise and crosswise in a circular path. Portions or segments of a certain percentage of the fibers in the starting web may not move into the grooves 42 of the molding member and may extend across the raised portions 43 of the molding surface between the fiber groupings lying in the grooves. More than one of such random segments may come together to form a small random group extending between the main groups. The alternate operation tends to minimize the occurrence of such random segments or groups. For example, when the raised portions 43 are approximately 1/32 inch wide, oscillation of the upper frame 52 in a circular path having a diameter of approximately 1/4 inch at approximately 180 cycles per minute for relatively short periods of time, say in the order of about 10 seconds or even less, will provide a fabric according to this invention. Since a substantial portion of the oscillatory motion of the frame 52 will be absorbed by the flexure of the resilient material in the block 41, it is difficult to determine the exact amplitude of oscillation of the surface of the resilient block 41 in contact with the web in the above example. It is preferred that the amplitude of oscillation of this surface at least be equal to the individual widths of the raised portions 43 in order to push the fibers overlying these portions into the grooves 42.

FIGS. 14 through 18 illustrate various groove patterns or patterns of projections for the molding member which will form openings and cause fiber groupings to be formed in corresponding patterns in the fabric of this invention. The square pattern of FIGS. 12 and 13 may be modified somewhat, as shown in FIGS. 14 and 15 which illustrate projections 81 with square ends 82 having inclined side surfaces 83 defining grooves 84 between them. The tapered projections 81 facilitate the removal of the fabric from the molding member as well as aiding in its formation. FIG. 16 illustrates the use of hexagonal projections 85 to define grooves 86 arranged in a reticular pattern wherein three grooves interconnect at 120 degrees to one another. A molding surface of this type will cause a similar arrangement of interconnected fiber groupings. The hexagonal raised portions may be tapered for the reasons mentioned above in connection with FIG. 14. FIG. 17 illustrates a molding surface having cylindrical projections 87 while FIG. 18 illustrates projections 88 which are triangular. The triangular projections of FIG. 18 are arranged in such a way as to define a pattern of grooves 89 wherein six grooves interconnect and extend at 60 degrees to one another.

Referring to FIGS. 19 through 21, there is illustrated a method and means for forming a fabric according to this invention. A base web or fibrous layer of the type described hereinbefore may be placed in an open position between hole defining means 92 below the web and web engaging means 93 above it, which are adapted to oscillate to a limited extent with respect to one another in the plane of the web for forming a porous nonwoven fabric. The hole defining means 92 may comprise a multiplicity of spaced projections 94 arranged in a definite pattern on a member presenting a continuous surface 95 between projections. The projections 94 may be in the form of small knobs, conical frustums or similar protuberances, preferably having side surfaces 96 which are inclined toward the continuous surface 95 of the hole defining member 92. The projections may be arranged in a pattern corresponding to the pattern of holes desired to be formed in the resulting fabric. As shown in FIG. 19, the projections may be uniformly spaced and arranged in a "square" pattern. The web engaging member 93 preferably comprises a resilient surface such as that presented by one side of a sponge rubber belt.

As shown schematically in FIG. 20, the web may be placed between the hole defining member 92 and the web engaging member 93 and the members may be brought together to support the web between the ends of the projections 94 and the inner surface of the web engaging member 93. Preferably the web is supported under pressure at least to the extent that the ends of the projections 94 and the surface of the web engaging member 93 would be in contact were it not for the web between them. The members then may be oscillated slightly with respect to one another such that the motion of the web engaging member 93 with respect to the projections 94 will cause those portions of the fibers originally passing over the projections to move away from the ends of the projections. As shown in FIG. 21, the projections 94 then may contact the surface of the web engaging member 93, and the web 91 may be supported by the inclined sides 96 of the projections and the surface 95 of the hole defining member 92. Preferably, the web engaging member presents a surface which is relatively rough compared with the surfaces of the projections since it is desirable that the web enter into greater frictional contact with this member as compared to the projections so that the web will tend to move more with the surface of the web engaging member 93 than with the ends of the projections 94 during the aforesaid oscillation.

The motion of the web 91 relative to the ends of the projections 94 tends to bend and rearrange those portions of the fibers passing over the projections in new positions in mechanical equilibrium adjacent the edges of the projections, thereby forming holes in the web in the way of the projections. As described hereinbefore, the rearranged fibers retain their new configurations, frictionally engaged and interlocked with proximate fibers to define relatively distinct and permanent pores or holes in the fabric. The size and shape of the holes formed will depend to a large extent upon the size and shape of the projections 94, although the holes may be elongated in the direction of orientation of the fibers in the base web, as shown in FIG. 9.

It is preferred that the web engaging member 93 be of resilient material so that it will fit over the ends of the projections 94 and protrude slightly into the spaces between them when the web engaging member 93 and the hole defining member 92 are brought together as aforesaid. When the members are oscillated with respect to one another while holding the web with this sort of resilient interfitting between them, the fiber segments in the way of the projections 94 will be moved away from the ends of the projections and urged into the spaces between them by the protruding portions 97 of the resilient member 93. The resilient web engaging member also may move the fiber segments downwardly along the inclined sides 96 of the projections to form holes larger than otherwise would be formed if a resilient member is not employed. A fabric may be formed by relative oscillation of the members 92 and 93 in one direction, or in different directions in the plane of the web.

As shown in FIGURES 22 and 23, projections 98 may be closely spaced and designed with shallow inclined sides 99 to give relatively tight group formation with relatively short projections. The short inclined projections 98 will slowly work their way into the web and the protruding portions of a co-operating resilient member 101 may be employed to move fibers away from the ends of the projections 98 and down their sides until relatively tight groups 102 of fibers are formed around the bases of the projections.

Figure 24:
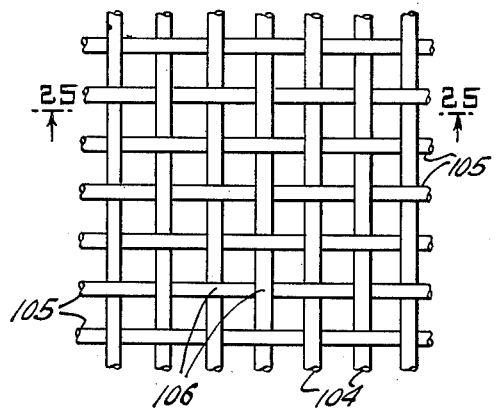
FIG. 24 is a plan view of a woven screen forming means according to this invention.
Figure 25:
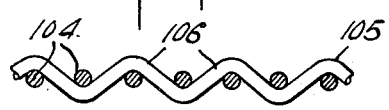
FIG. 25 is a view partly in section and partly in elevation along the line 25—25 of FIGURE 24.

Another type of hole defining member is illustrated in FIGS. 24 and 25 wherein a screen of interwoven wires is employed to define the pattern of holes desired. This screen may be woven with the wires 104 in one direction remaining relatively straight while the wires 105 in the other direction are crimped. A pattern of spaced projections is formed by those portions 106 of the crimped wires 105 which form alternate intersections with the relatively noncrimped wires 104. These projections are relatively blunt and oblong and have sides inclined in the direction of the crimped wires, with the result that they tend to form slightly oblong holes when oscillated with respect to a resilient web engaging surface. Those portions of the crimped wires 105 between projections cooperate with the "noncrimped" wires 104 to substitute for the continuous surface 95 of FIGS. 19 through 21 to provide means for supporting the web after penetration by the projections.

Figure 26:
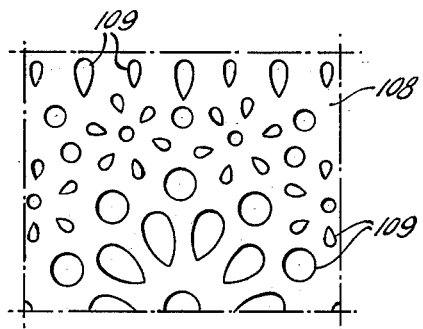
FIG. 26 is a plan view of means comprising specially shaped projections arranged in a lace-like pattern.
Figure 27:
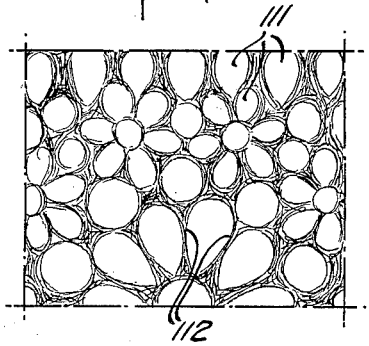
FIG. 27 is a plan view of a fabric formed employing the means of FIG. 26.

Still another form of hole defining member 108 is shown schematically in FIGURE 26. The member 108 comprises spaced irregularly shaped projections 109. These projections are shaped and arranged in a pattern resembling the holes in a lace. In FIGURE 27 there is illustrated a lacy nonwoven fabric, formed on the member 108, which comprises holes 111 shaped and arranged to correspond to the projections 109. This fabric comprises closely assembled fibers arranged in interconnected groups 112 of fiber segments. The groups 112 define the holes 111 between them.

Figure 28:
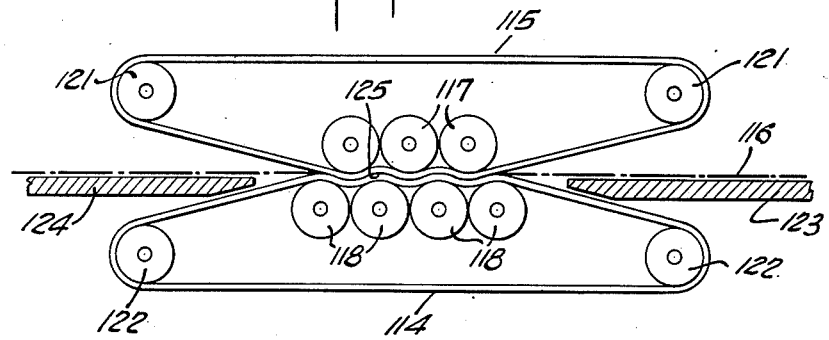
FIG. 28 is a schematic view partly in longitudinal section of another device for forming a fabric according to this invention.

As shown in FIG. 28, the hole defining or fabric forming member and the fabric engaging member may be in the form of continuous moving belts 114 and 115, respectively, in which case they may be urged together with a web 116 between them and oscillated with respect to one another by means contacting their opposite surfaces as they move along. As suggested previously, the fabric engaging belt 115 may be of sponge rubber or a similar resilient material which will resist the continuous wear and flexure it must withstand. The hole defining member may comprise a hard rubber or any other suitable hard material, when in the form illustrated in FIGS. 14 through 23, or it may comprise a relatively flexible sheet of material with inserts of relatively hard material forming the projections. The screening of FIGS. 24 and 25 also may be in the form of a continuous belt.

The belts 114 and 115 with the web 116 between them may be passed between sets of upper rollers 117 and lower rollers 118 designed to be oscillated axially or axially and circumferentially with respect to one another in a manner such as described in U.S. Patent No. 2,093,709 or 2,506,855, both disclosing machines, and mechanisms for machines of the continuous felting type. The resilient belt 115 may pass around the upper rollers 117 and guide rollers 121 at the front and the rear of the upper rollers, and the hole defining belt 114 may pass around the lower rollers 118 and guide rollers 122 at the front and the rear thereof. The upper and lower guide rollers may be spaced to cause the upper and lower belts to converge as they move toward the oscillating rollers and diverge as they leave these rollers.

The web 116 may enter between the belts 114 and 115 where they converge at the front of the oscillating rollers and leave them where they diverge at the rear of these rollers. Suitable tables 123 and 124 may be provided for supporting the web 116 adjacent the points where it enters and leaves the belts. The rollers 117 and 118 may oscillate axially or circumferentially relative to one another while they continue to rotate to feed the superimposed belts 114 and 115 between them at an economical production rate. The upper and lower sets of rollers may be spaced or urged together in such a way as to press the resilient belt and the web against the ends of the projections on the lower belt. The relative oscillatory movement of the rollers may be transmitted through the belts 114 and 115 to their adjacent or contiguous surfaces.

The upper rollers alone may be oscillated in which case their movement will be distributed and partially absorbed by the resilient material of the web engaging belt 115 in contact therewith. Thus, the amplitude of oscillation of the inner surface 125 of the resilient belt 115 may be considerably less than the corresponding amplitudes of the oscillating rollers. As mentioned hereinbefore, the relative oscillatory motion of the belts may occur in only one direction, however, oscillation in different directions in the plane of the web may be desirable from the standpoint of uniformity. The amplitudes of relative motion between the inner surface 125 of the web engaging belt and the ends of the projections on the hole forming belt should be controlled to prevent damage to the web in the form of excessively large holes or tears, clumps of loose fibers, etc.

When the screening of FIGS. 24 and 25 is employed, an additional resilient belt, not shown, may be employed between the screening and the lower oscillating rollers 118. This additional belt tends to decrease the relative movement between the hole defining projections 106 of the screening and the inner surface 125 of the upper belt and also acts to distribute the oscillatory forces and cushion the impact of these forces upon the screening. However, satisfactory results may be achieved with the screening without the additional resilient belt described above. For instance, good results have been obtained with a web of the type described hereinbefore interposed between a resilient belt of sponge rubber ⅛ inch thick and a hole defining belt of 24 x 20 wire screening of the type generally described above, when the resilient belt and screening are run between upper and lower rollers about 4 inches in diameter at a linear speed of approximately 20 feet per minute while the upper rollers oscillate ⅛ inch both axially and circumferentially at frequencies ranging between 800 and 1,600 cycles per minute. At such speeds a nonwoven fabric according to this invention may be formed during the period the web is in contact with the screening which may be in the neighborhood of 1 to 10 seconds, depending upon the number of rollers employed and the inclination of the resilient belt to the screening.

In FIG. 29, there is shown an illustrative embodiment of another apparatus for forming fabrics according to this invention. This apparatus is shown and described in detail and claimed in the copending application of Frank Kalwaites, Serial No. 567,275, filed February 23, 1956, now Patent No. 2,862,251, granted December 2, 1958.

This apparatus comprises a foraminous forming member in the form of a perforated drum 131, a foraminous backing member in the form of a continuous screen belt 132, and spray nozzles 133 inside the drum for projecting streams of fluid, preferably a liquid such as water through perforations 134 in the drum. A layer 135 of starting material, suitably in the form of a three-ply laminate of webs of carded cotton fibers, for example, may be sandwiched between the drum and the belt to be formed into a fabric of this invention by the fluid being projected through the drum.

The drum, which may have flanges 136 at each end for reinforcing purposes, is mounted in the cradle formed by two pairs of spaced flanged wheels 137. Each pair comprises a wheel 137 at each end of the drum fixed to a common shaft 138 which in turn is free to rotate in stationary bearings 139 mounted on a fixed foundation frame 141. The axles or shafts 138 supporting each pair of wheels are spaced to provide stable support for the drum 131. Each wheel includes an external flange 142 extending upwardly from its supporting surface beyond one of the ends of the drum 131 and adjacent thereto, thereby holding the drum in position axially.

The screen 132 passes around a major segment of the drum and is held in position thereon by positioning rollers located above the drum and close to its surface. The first positioning roller 143a appears at the left and the second positioning roller 143b appears at the right in FIGURE 29. These rollers are fixed to shafts 144 and 145 respectively, which are free to rotate in bearings 146 and 147 mounted on horizontal frame members 148 supported from the foundation frame member 141 by vertical uprights 149 at each end of the drum. The belt also passes around adjustable guide rollers 151 below the drum which may be mounted on shafts free to rotate in bearings not shown, which are mounted in the foundation frame member 141. The position of at least one of the rollers 151 may be adjusted by positioning bolts 152 which are threaded through the foundation. The position of one or more of these rollers may be adjusted to remove or replace a belt and tension it in position.

The screen belt 132, after passing around the drum 131, turns around the second positioning roller 143b and thence around and through the nip between a pair of squeeze rollers 153 and 154. Preferably, the bottom roller 153 is driven from a power source, not shown, through conventional means such as a belt, chain, or a chain of gears, also not shown. The pressure at the nip between the rollers 153 and 154 may be controlled by any suitable means.

Preferably, the nozzles 133 for supplying liquid in streams to the inside wall of the perforated drum 131 are mounted at the ends of tubes 155 arranged in banks along the length of a pressure cylinder 156 which in turn has a flange 157 at one end attached to the main frame through a vertical upright, not shown. The flange 157 possesses slotted bolt holes 158 to allow the cylinder 156 to be positioned properly with respect to the axis of the drum. The nozzle assemblage is stationary and the drum revolves about the same.

Fluid under pressure may be applied to the interior of this cylinder from any suitable source, not shown. There may be one line or bank of nozzles positioned partly or entirely across the perforated wall of the drum, but it is preferred that at least two banks of nozzles be employed. Three, four or even more banks of nozzles may be advantageous under certain conditions since they tend to increase the range of speed of the machine. Various conventional forms of nozzles may be employed, although solid cone nozzles are preferred. The foundation frame member 141 itself may act as a sump for the liquid passing through the portions of the screen in the way of the nozzles, or subsequently falling from the screen, drum, or the pressure nip. However, separate means, not shown, defining a pan or sump in or around the foundation frame, may be employed. Splash plates such as shown at 159 may be attached to the frame at both ends of the drum and similar plates or shields may be designed to fit around the screen to provide a splashproof enclosure.

In operation the layer of starting material 135, which may be a web of carded cotton fibers, for example, may be passed over the first positioning roller and into contact with the continuous screen 132. The screen, carrying the web, may be passed around the portion of the drum 131 in the way of liquid being projected through the perforations 134 of the drum, then around the drum, over the second positioning roller 143b, and thence through the nip formed by the squeeze rollers 153 and 154. The bottom squeeze roller 153 drives the screen 132 and the screen carries the web and drives the drum 131 with no slip between the drum and the screen. The web 135 of material is formed into a fabric 161 according to this invention as it passes in the way of the liquid being projected through the perforations in the drum. The fabric retains some of this liquid as it passes around the drum, although most of it passes through the screen and drops into the collecting sump before the screen carrying the layer reaches the pressure nip. At the pressure nip the major portion of the remaining liquid is squeezed from the fabric 161. The fabric is separated from the backing screen 132 after the screen and fabric have passed from the pressure nip and have moved around and over roller 154.

A portion of the sandwich formed by the drum 131, web 135, and screen 132 is shown in FIGURES 30 and 31. The perforations 134 in the drum are round and arranged in a regularly spaced square pattern or other desired regular pattern. In general, it is preferred that the dimension of the foramina or openings in the foraminous screen be substantially less than the dimension of the openings in the drum, and for best results it is preferred that the openings in the screen be considerably smaller than the openings in the drum. For example, with the drum having uniform openings in the order of about $\frac{1}{32}$ of an inch in diameter, good results may be obtained where openings in the foraminous screen may vary from about 900 openings per square inch to about 50,000 openings per square inch, preferably from about 10,000 openings to 40,000 openings per square inch.

As shown in FIGURE 33, the liquid is projected through the perforations 134 in spaced streams which pass through the web striking the screen 132 to spread sideways and then pass through the openings in the screen. The streams are delivered with a water pressure inside the pressure cylinder of about 90 to 100 lbs. per square inch. The fibers in the web in the way of the streams are moved sideways by the streams beyond the edges of the perforations 134 and under the solid portions of the drum between perforations. As illustrated in FIGURES 32 and 33, the fibers between the perforations may be arranged in yarn-like groups 162 of closely associated and substantially parallelized fiber segments. The groups 162 are interconnected by fibers common to a plurality of bundles at junctures 163 wherein the fibers are oriented in a plurality of diverse directions generally in the direction of the lay of the web, forming a fabric according to this invention. The groups may be yarn-like in cross section in FIGURE 33, particularly midway between junctures where they appear to be most parallelized. The fibers are in mechanical engagement in the fabric structure to the extent that they are in mechanical equilibrium.

The base web or layer of starting material may comprise natural fibers, such as fibers of cotton, wood, wool, jute, ramie, or abaca; or artificial fibers of viscose rayon, cuprammonium rayon, cellulose acetate, nylon, Dynel or other materials, alone or in combination with one another. Viscose rayon is known to give excellent results in forming a fabric according to this invention. While relatively long textile-type fibers above normal paper making lengths and close to normal textile length or over, say of about ¼″ to 2″ or longer are preferred for textile applications, shorter fibers, below ¼ inch in length, within the paper range, may be used for these and other applications. It is preferred that the shorter paper making fibers, if used, be unbeaten or substantially unhydrated if a textile-like fabric is desired. In this connection, shorter fibers of woodpulp, for instance, may be mixed with longer fibers with the result that the longer fibers will enhance the strength of the resulting fabric and the shorter fibers will decrease its cost. Fiber length is also an important factor affecting fabric strength, as described hereinbefore, and fiber lengths and materials should be chosen with this and other fabric characteristics in mind.

There are a number of suitable adhesive bonding materials, or binders which may be included in the web prior to, or during, formation. For instance, water softenable materials including the following may be used: beaten cellulose jellies of woodpulp, caroa, ramie, etc.; natural gums including karaya, locust bean, gum arabic and others; starches; and synthetics, such as polyvinyl alcohol, carboxymethylcellulose, polyvinyl acetate, etc. Suitable binders, softenable by solvents other than water, are exemplified by polyvinyl chloride and polyvinyl butyral and their copolymers, while nonreversible binders which may be used if formation occurs before they are set, include urea-formaldehyde and melamine-formaldehyde.

Having now described the invention in specific detail and exemplified the manner in which it may be carried into practice, it will be readily apparent to those skilled in the art that innumerable variations, applications, modifications and extensions of the basic principles involved may be made without departing from its spirit or scope. Thus the fabrics of the present invention may be laminated with other fabrics, with paper or with other materials, or employed in a host of ways that will be readily apparent to the skilled artisan.

The claims are:

1. A foraminous, self-sustaining nonwoven textile fabric comprising a multiplicity of yarn-like fiber groups having an oval cross section interconnected at junctures by fibers common to a plurality of said groups to define a predetermined pattern of holes, the fibers at said junctures being oriented in a plurality of diverse directions in the lay of the fabric, and the fibers in the yarn-like groups between the junctures being in substantial parallelism and in overlapping relationship with one another with individual interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

2. A foraminous, self-sustaining nonwoven textile fabric comprising substantial areas consisting essentially of a multiplicity of yarn-like fiber groups having an oval cross section interconnected at junctures by fibers common to a plurality of said groups to define a predetermined pattern of holes, the fibers at said junctures being oriented in a plurality of diverse directions in the lay of the fabric, and the fibers in the yarn-like groups between the junctures being in substantial parallelism and in overlapping relationship with one another with individual interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas.

3. A foraminous, self-sustaining nonwoven textile fabric comprising interconnected yarn-like groups of unspun fiber segments closely associated and substantially parallelized about the longitudinal axes of the groups, said groups possessing yarn-like thickness in two dimensions and being interconnected by fibers common to a plurality of groups, said groups and said interconnecting fibers defining a predetermined pattern of holes, individual interconnecting fibers extending in more than one direction in the lay of the fabric and having substantial segments thereof mechanically engaged with other fiber segments in various groups, the fibers in said fabric being in mechanical equilibrium, and said yarn-like fiber groups in areas of fabric containing the same being located between spaced generally parallel planes generally defining the opposed surfaces of the fabric in said areas.

4. A foraminous, self-sustaining nonwoven textile fabric comprising interconnected groups of fiber segments closely associated and substantially parallelized about the longitudinal axes of the groups to the extent that the groups are yarn-like, said interconnected groups extending longitudinally and transversely of the fabric and defining a predetermined pattern of holes between them, said groups being interconnected by fibers common to a plurality of groups, individual interconnecting fibers extending in more than one direction in the lay of the fabric and having substantial segments thereof mechanically engaged with other fiber segments in various groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

5. A foraminous, self-sustaining nonwoven textile fabric comprising a multiplicity of yarn-like fiber groups lying in the plane of the fabric and interconnected at junctures by fibers in the plane of the fabric and common to a plurality of groups to define a predetermined pattern of holes, the fibers in the yarn-like groups between the junctures being in substantial parallelism and in overlapping relationship with one another, and the fibers at said junctures being oriented in a plurality of diverse directions in the lay of the fabric, individual interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

6. A foraminous, self-sustaining nonwoven textile fabric comprising fibers arranged to form interconnected yarn-like bundles of fiber segments, said interconnected bundles defining a predetermined pattern of holes between them, the individual segments in each of said bundles being substantially parallel to the other individual segments in the bundle and consolidated with the same segments with which they are substantially parallel, said bundles being interconnected at junctures by fibers common to a plurality of bundles, individual interconnecting fibers at each juncture extending in more than one direction in the lay of the fabric and having substantial segments thereof mechanically engaged with other fiber segments in various bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

7. A foraminous, self-sustaining nonwoven textile fabric comprising nonfeltable fibers oriented to define a foraminous structure comprising a multiplicity of yarn-like fiber groups interconnected by fibers common to a plurality of groups at junctures to define a predetermined pattern of holes, the fibers at said junctures being oriented in a plurality of diverse directions in the lay of the fabric, the fibers in the yarn-like groups between the junctures being in substantial parallelism and in overlapping relationship with one another, individual of said interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

8. A foraminous, self-sustaining nonwoven textile fabric comprising interconnected yarn-like groups of unspun fiber segments, said segments being closely associated and substantially parallelized about the longitudinal axes of the groups and said groups possessing yarn-like thickness in two dimensions and having an oval cross section, said groups being interconnected at junctures by fibers common to a plurality of groups to define a predetermined pattern of holes, individual of said interconnecting fibers extending in more than one direction in the lay of the fabric and having substantial segments thereof mechanically engaged with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

9. A foraminous, self-sustaining nonwoven textile fabric comprising nonfeltable fibers arranged to form interconnected yarn-like bundles of fiber segments defining a predetermined pattern of holes between them, segments in each of said bundles being substantially parallel to and consolidated with other segments in the same bundle and said bundles being interconnected by fibers common to a plurality of bundles, individual of said interconnecting fibers extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas.

10. A foraminous self-sustaining nonwoven textile fabric comprising fibers arranged to form interconnected bundles of fiber segments possessing yarn-like thickness in two dimensions, individual segments in each of said bundles being substantially parallel to the other segments in the bundle and consolidated with the same segments with which they are substantially parallel, said bundles being interconnected by fibers common to a plurality of bundles and defining a predetermined pattern of holes between the bundles, at least some of said substantially parallel and consolidated segments lying in the fabric at locations generally intermediate the perimeters of adjacent holes defined by said interconnected bundles, individual interconnecting fibers extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

11. A foraminous, self-sustaining nonwoven textile fabric comprising fibers arranged to form interconnected yarn-like bundles of fiber segments defining a predetermined pattern of holes between them, individual segments in each of said bundles being substantially parallel and consolidated with other segments in the same bundle to give bundles having an oval cross section, said bundles being interconnected at junctures by fibers common to a plurality of bundles, said interconnecting fibers between any two given bundles being substantially parallel to and consolidated with each other as they pass through the juncture between said two bundles, individual interconnecting fibers at each juncture extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

12. A self-sustaining nonwoven textile fabric comprising fibers arranged to form interconnected yarn-like bundles of fiber segments, said interconnected bundles defining a predetermined pattern of areas of low fiber density between them, individual segments in each of said bundles being substantially parallel to the other individual segments in the bundle and consolidated with the same segments with which they are substantially parallel so that the bundles have an oval cross section, said bundles being interconnected at junctures by fibers common to a plurality of bundles, individual interconnecting fibers at each juncture extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

References Cited in the file of this patent

UNITED STATES PATENTS

| | | |
|---|---|---|
| 720,857 | Tourigny | Feb. 17, 1903 |
| 795,719 | Motz | July 25, 1905 |
| 995,602 | Howes | June 20, 1911 |
| 1,447,708 | Caffrey | Mar. 6, 1923 |
| 1,453,575 | Tong et al. | May 1, 1923 |
| 1,978,620 | Brewster | Oct. 30, 1934 |
| 1,989,434 | Wallquist | Jan. 29, 1935 |
| 2,168,775 | Hurst et al. | Aug. 8, 1939 |
| 2,170,655 | Fourness | Aug. 22, 1939 |
| 2,351,039 | Hanson | June 13, 1944 |
| 2,366,070 | Strauss | Dec. 26, 1944 |
| 2,416,390 | Hitt | Feb. 25, 1947 |
| 2,486,217 | Slack et al. | Oct. 25, 1949 |
| 2,508,968 | Porritt | May 23, 1950 |
| 2,528,793 | Secrist | Nov. 7, 1950 |
| 2,537,323 | Wurzburger | Jan. 9, 1951 |
| 2,705,687 | Petterson et al. | Apr. 5, 1955 |
| 2,705,688 | Ness et al. | Apr. 5, 1955 |
| 2,712,171 | Hoffman | July 5, 1955 |
| 2,771,363 | Fish | Nov. 20, 1956 |

FOREIGN PATENTS

| | | |
|---|---|---|
| 422,226 | Great Britain | Jan. 8, 1935 |
| 468,106 | Great Britain | June 29, 1937 |
| 116,987 | Japan | Aug. 17, 1936 |
| 120,565 | Japan | June 2, 1937 |
| 131,851 | Japan | Aug. 25, 1939 |

OTHER REFERENCES

Handmade Papers of Japan, T. K. and R. H. Tindale, Charles E. Tuttle Co., Rutland, Vt., and Tokyo, Japan. Printed in Tokyo in 1952.

"Matthews' Textile Fibers," 5th Ed., John Wiley and Sons, New York, New York, 1947. Pages 765–772.